(12) United States Patent
Ito

(10) Patent No.: US 11,736,650 B2
(45) Date of Patent: Aug. 22, 2023

(54) SYSTEM, AND IMAGE PROCESSING APPARATUS AND METHOD FOR CONTROLLING THE SAME

(71) Applicant: CANON KABUSHIKI KAISHA, Tokyo (JP)

(72) Inventor: Chie Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/853,571

(22) Filed: Jun. 29, 2022

(65) Prior Publication Data

US 2023/0007145 A1     Jan. 5, 2023

(30) Foreign Application Priority Data

Jul. 1, 2021  (JP) .................................. 2021-110059

(51) Int. Cl.
| | |
|---|---|
| *H04N 1/00* | (2006.01) |
| *H04N 1/44* | (2006.01) |
| *H04L 51/216* | (2022.01) |

(52) U.S. Cl.
CPC ......... *H04N 1/4413* (2013.01); *H04L 51/216* (2022.05); *H04N 1/4486* (2013.01); *H04N 2201/3235* (2013.01)

(58) Field of Classification Search
CPC ............................ H04N 1/4413; H04N 1/4486
See application file for complete search history.

(56) References Cited

U.S. PATENT DOCUMENTS

| | | | |
|---|---|---|---|
| 2011/0033040 A1* | 2/2011 | Nakashima | H04N 1/4433 358/1.15 |
| 2020/0099637 A1* | 3/2020 | Kurokawa | H04N 1/0087 |
| 2021/0144266 A1* | 5/2021 | Tsukada | H04N 1/00212 |
| 2021/0160393 A1* | 5/2021 | Sugita | H04N 1/00472 |
| 2021/0195060 A1* | 6/2021 | Hasegawa | H04L 63/08 |
| 2022/0217247 A1* | 7/2022 | Kamihisa | H04N 1/32128 |

FOREIGN PATENT DOCUMENTS

| | | |
|---|---|---|
| JP | 2009033396 A | 2/2009 |
| JP | 2020047039 A | 3/2020 |
| JP | 2021028812 A | 2/2021 |
| JP | 2021-078084 A | 5/2021 |

\* cited by examiner

*Primary Examiner* — Benjamin O Dulaney
(74) *Attorney, Agent, or Firm* — Canon U.S.A., Inc. IP Division

(57) ABSTRACT

A system includes an image processing apparatus and an information processing apparatus that provides a chat service, the image processing apparatus includes a reading unit that reads an image on a document, a memory, and a processor that executes a program stored in the memory to generate a file based on the read image, receive a password from a user, encrypt the generated file, using the received password, and transmit the encrypted file and the received password to the information processing apparatus, wherein the information processing apparatus includes a memory, and a processor that executes a program stored in the memory to cause the information processing apparatus to receive, from the image processing apparatus, the encrypted file and the received password, execute processing for posting the received encrypted file to a channel specified by the user, and execute processing for posting the received password to the channel.

17 Claims, 18 Drawing Sheets

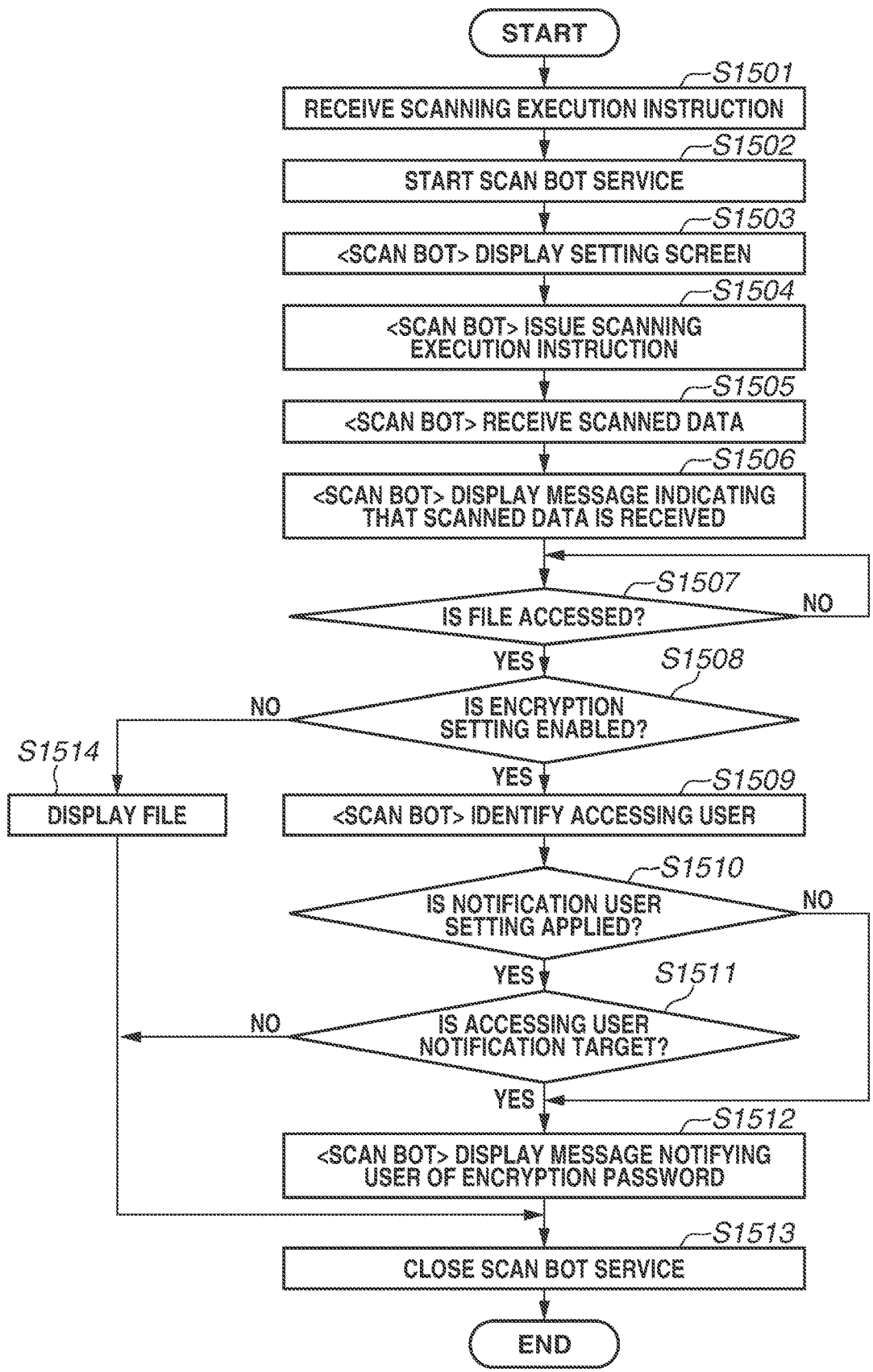

*602* — USER 1

*603* — ■USER
· USER 2
· USER 3

*604* — ■CHANNEL
· CHANNEL 1
· CHANNEL 2
· CHANNEL 3

*605* — . . .

★ CHANNEL 1

*607* — EXECUTE SCANNING

USER 1 — *1601*

SCAN SETTINGS

| READING SIZE: A4 | > |
| FILE FORMAT: PDF | > | — *1602*
| DENSITY: STANDARD | > |
| DOCUMENT ORIENTATION: PORTRAIT | > |

PDF SETTINGS — *1603*

| ENCRYPTION: ENABLED | > | — *1604*
| DEVICE SIGNATURE: DISABLED | > |
| PAGE SPLIT: OFF | > |

PDF ENCRYPTION SETTING

ENCRYPTION PASSWORD: — *1605* q w e r t y u i o p @
a s d f g h j k l + *
z x c v b n m < > ? _ 1/#

OK

SYSTEM, AND IMAGE PROCESSING APPARATUS AND METHOD FOR CONTROLLING THE SAME

BACKGROUND

Field

The present disclosure relates to a system, and an image processing apparatus and a method for controlling the same.

Description of the Related Art

Japanese Patent Application Laid-Open No. 2021-78084 discusses a technique for transmitting image data, generated in an image processing apparatus by scanning an image on a document, to a chat server providing a chat service, whereby the image data is shared in a talk room of the chat service.

In a case where the image data generated by scanning the image on the document is uploaded to the talk room as discussed in Japanese Patent Application Laid-Open No. 2021-78084, a password can be set on the image to be uploaded and a restriction is imposed on viewing the image data. For example, in a case where image data for which a password is set is shared among a plurality of users participating in a talk room and the users participating in the talk room are allowed to view the image data, an issue for the user can arise. More specifically, uploading the image data for which the password is set to the talk room and transmitting a message for notifying the users participating in the talk room of the password requires some work for the user.

SUMMARY

Aspects of the present disclosure are directed to saving a user time and trouble when image data for which a password is set is shared in a talk room.

According to an aspect of the present disclosure, a system includes an image processing apparatus and an information processing apparatus configured to provide a chat service, wherein the image processing apparatus comprises a reading unit configured to read an image on a document, a memory, and a processor that executes a program stored in the memory to generate a file based on the read image, receive a password from a user, encrypt the generated file using the received password, and transmit the encrypted file and the received password to the information processing apparatus, wherein the information processing apparatus comprises a memory, and a processor, wherein the processor executes a program stored in the memory to cause the information processing apparatus to receive, from the image processing apparatus, the encrypted file and the received password, execute processing for posting the received encrypted file to a channel specified by the user and corresponding to the chat service, and execute processing for posting the received password to the channel.

Further features will become apparent from the following description of exemplary embodiments with reference to the attached drawings.

BRIEF DESCRIPTION OF THE DRAWINGS

FIG. 15 is a flowchart illustrating an example of the processing for uploading the file generated by the image processing apparatus to the channel and notifying the other users of the file's password.

FIGS. 16A to 16C are diagrams each illustrating an example of a scan setting screen.

DESCRIPTION OF THE EMBODIMENTS

In the following description, exemplary embodiments will be described in detail with reference to the attached drawings. The present exemplary embodiments will be described citing a multi-function peripheral having a print function, a scan function, and a facsimile function as an example of an image processing apparatus, but this is not seen to be limiting. Not all of combinations of features that will be described in the present exemplary embodiments are necessarily essential to the solution of the present disclosure.

Figure 1:
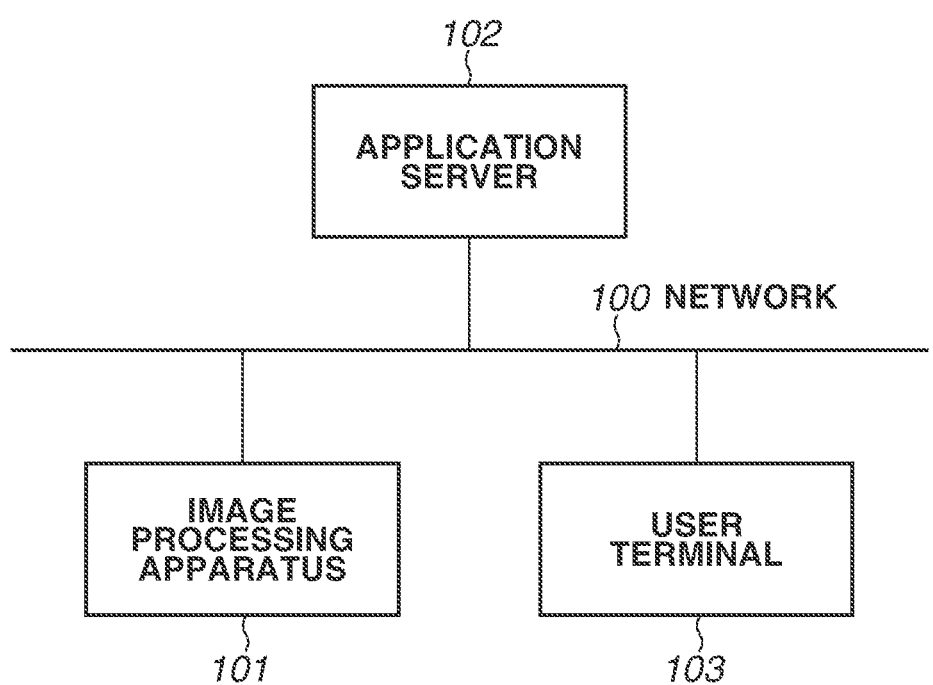
FIG. 1 is a diagram illustrating an example of a configuration of a system according to an exemplary embodiment.

FIG. 1 illustrates an example of the configuration of a system according to a first exemplary embodiment. An image processing apparatus 101, an application server 102, which is an information processing apparatus, and a user terminal 103, which is an external apparatus, are connected via a network 100 to communicate with each other. A plurality of image processing apparatuses and/or servers (not illustrated) can be connected to the system.

The image processing apparatus 101 is, for example, a multi function peripheral (MFP). The image processing apparatus 101 reads an image on a document and generates image data. The image processing apparatus 101 has a function of transmitting a file containing the generated image data to the application server 102 via the network 100. Various types of services, such as a chat application and a bot service, run on the application server 102. The application server 102 provides, for example, an online storage function that stores a file transmitted from the but service or the image processing apparatus 101. The application server 102 can be a single server machine or can be a group of machines including a plurality of servers. The image processing apparatus 101, the application server 102, and the user terminal 103 can be located on the same network.

Figure 2:
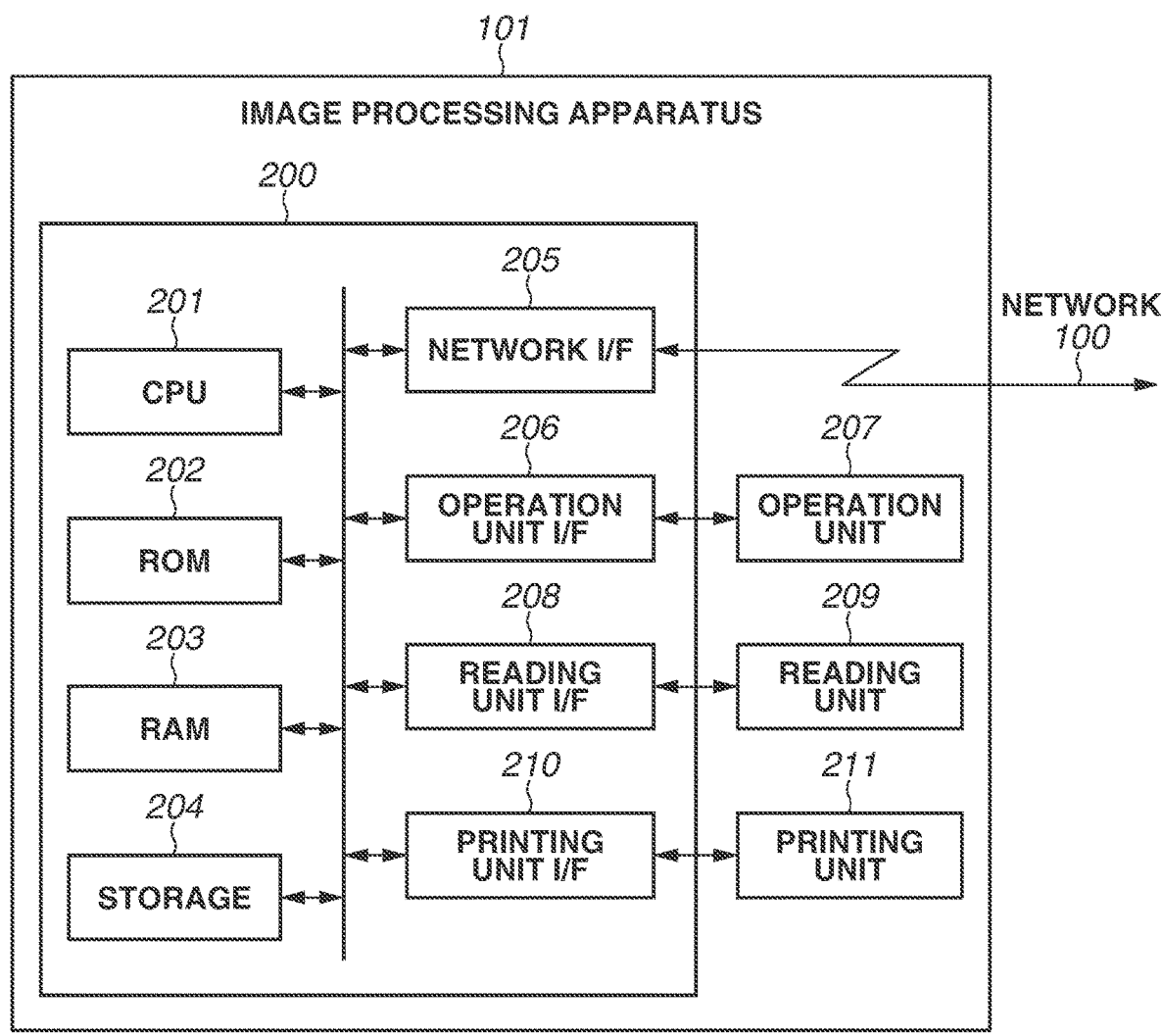
FIG. 2 is a diagram illustrating an example of a hardware configuration of an image processing apparatus.

FIG. 2 illustrates an example of the hardware configuration of the image processing apparatus 101. The image processing apparatus 101 has a reading function of reading an image on a document and a print function of printing an image on a sheet. The image processing apparatus 101 also has, for example, a file transmission function of transmitting image data to an external apparatus.

As indicated above, the present exemplary embodiment will be described using an MFP as the image processing apparatus 101. However, the image processing apparatus 101 is not limited to being an MFP. For example, the image processing apparatus 101 can be an image reading apparatus, such as a scanner, that does not have the print function.

A control unit 200 including a central processing unit (CPU) 201 controls the overall operation of the image processing apparatus 101. The CPU 201 reads out and executes a control program stored in a read only memory (ROM) 202 or a storage 204, and performs various control functions, such as reading control and printing control. A random access memory (RAM) 203 is a main storage memory of the CPU 201, and is used as a work area and a temporary storage area for developing various types of control programs stored in the ROM 202 and the storage 204. The storage 204 stores print data, image data, various types of programs, and various types of setting information therein. The storage 204 is a storage device, such as a hard disk drive (HDD) and/or a solid state drive (SSD).

In the following description, the image processing apparatus 101 according to the present exemplary embodiment is configured such that the CPU 201 performs each of processing procedures illustrated in sequences that will be described below using the single memory (RAM 203). In another exemplary embodiment, the configuration of the image processing apparatus 101 can be different. For example, the image processing apparatus 101 can be configured to cause a plurality of CPUs, RAMs, ROMs, and storages to cooperate with each other to perform each of the processing procedures illustrated in the sequences that will be described below. In another exemplary embodiment, the image processing apparatus 101 can be configured to perform a part of the processing using a hardware circuit, such as an application specific integrated circuit (ASIC) and a field-programmable gate array (FPGA).

An operation unit interface (I/F) 206 is connected to an operation unit 207. The operation unit 207, for example, displays information to a user and receives an input from the user.

A reading unit I/F 208 is connected to a reading unit The reading unit 209 reads an image on a document and generates image data. The image data generated by the reading unit 209 is transmitted to an external apparatus or an image is printed on a sheet using the image data. The reading unit 209 can read images while conveying documents placed on a document feeder (not illustrated) one by one.

A printing unit I/F 210 is connected to a printing unit 211. Image data to be printed is transferred to the printing unit 211 via the printing unit I/F 210. The printing unit 211 receives a control command and the image data to be printed, and prints an image based on the image data on a sheet. A print method employed by the printing unit 211 can include an electrophotographic method or an inkjet method.

In the case of the electrophotographic method, an electrostatic latent image is developed using toner after the electrostatic latent image is generated on a photosensitive member and the toner image is transferred onto a sheet and fixed on the sheet to form an image. In the case of the inkjet method, the image is printed on the sheet by discharging ink.

The image processing apparatus 101 is connected to the network 100 via a network I/F 205. The network I/F 205 connects the image processing apparatus 101 to the application server 102 and the user terminal 103 in the network 100 to communicate information and transmit files generated based on the image data generated by the reading unit 209.

The print data received via the network I/F 205 is analyzed by a software module (a Page Description Language (PDL) analysis unit, not illustrated) for analyzing the print data stored in the storage 204 or the ROM 202. The PDL analysis unit generates data to be printed by the printing unit 211 based on print data expressed in various types of Page Description Languages.

Figure 3:
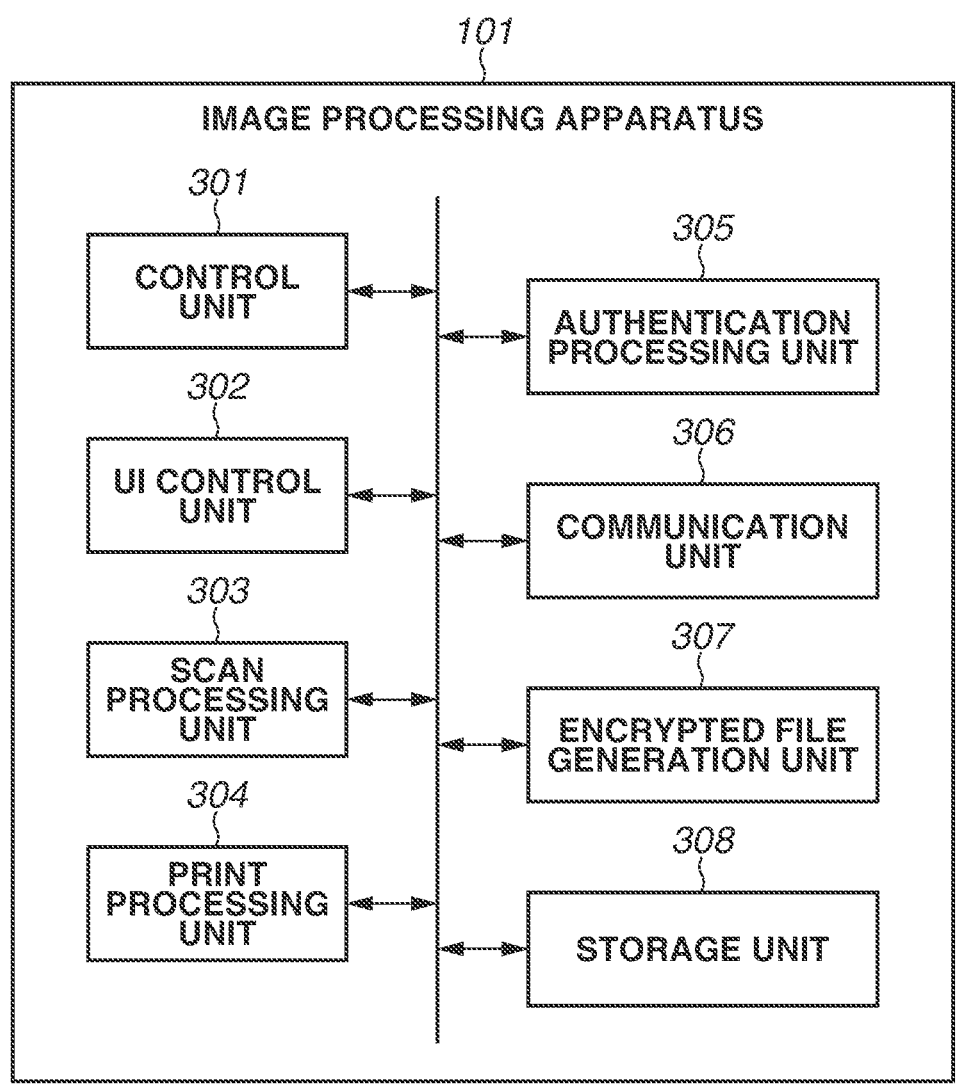
FIG. 3 is a diagram illustrating an example of a software configuration of the image processing apparatus.

FIG. 3 illustrates an example of the software configuration of the image processing apparatus 101. A control unit 301 controls other software units, to control execution of each processing procedure that occurs in the image processing apparatus 101, such as scanning, transmission, printing, and display processing.

An authentication processing unit 305 receives, in a case where user management is performed in the image processing apparatus 101, a login/logout request from the user. In response to receipt of the login request, the authentication processing unit 305 conducts authentication by referring to user management information stored by the storage unit 308. In a case where the authentication succeeds, the authentication processing unit 305 controls a user interface (UI) control unit 302 to cause a home screen to be displayed. The user management information can be managed in an externally located server, in this scenario, the authentication processing unit 305 conducts the authentication by transmitting authentication information to the external server.

The UI control unit 302 controls the operation unit 207 via the operation unit I/F 206. More specifically, the UI control unit 302 controls displaying of user notification, options, and the like on the operation unit 207, receives an operation performed by the user on the operation unit 207, and notifies other functional units of the content of the operation.

A scan processing unit 303 executes scanning (reading processing) by the reading unit 209 via the reading unit I/F 208, and the read image is stored by the storage unit 308.

A print processing unit 304 executes printing by the printing unit 211 via the printing unit I/F 210.

A communication unit 306 controls communication, such as data transmission/reception, with the application server 102 and other apparatuses in the network 100 via the network I/F 205.

An encrypted file generation unit 307 generates an encrypted file from the scanned image generated by the scan processing unit 303 using a password input by an operation performed by the user on the operation unit 207. In other words, the encrypted file generation unit 307 encrypts the file such that the file is to be decrypted using the password input by the operation performed by the user on the operation unit 207. In the present exemplary embodiment, encrypted Portable Document Format (PDF) is generated, but this format is not seen to be limiting. The format can be an image file, such as Joint Photographic Experts Group (JPEG) or text. The encrypted PDF is stored by the storage unit 308. The password can be formed by just characters, by just numbers, or a combination of numbers and characters.

The storage unit 308 stores or reads out specified data in or from the ROM 202, the RAM 203, or the storage 204 based on an instruction from another functional unit. In the present exemplary embodiment, the storage unit 308 manages scanned images read by scanning, the user management information, data received by the communication unit 306, and the like.

Figure 4:
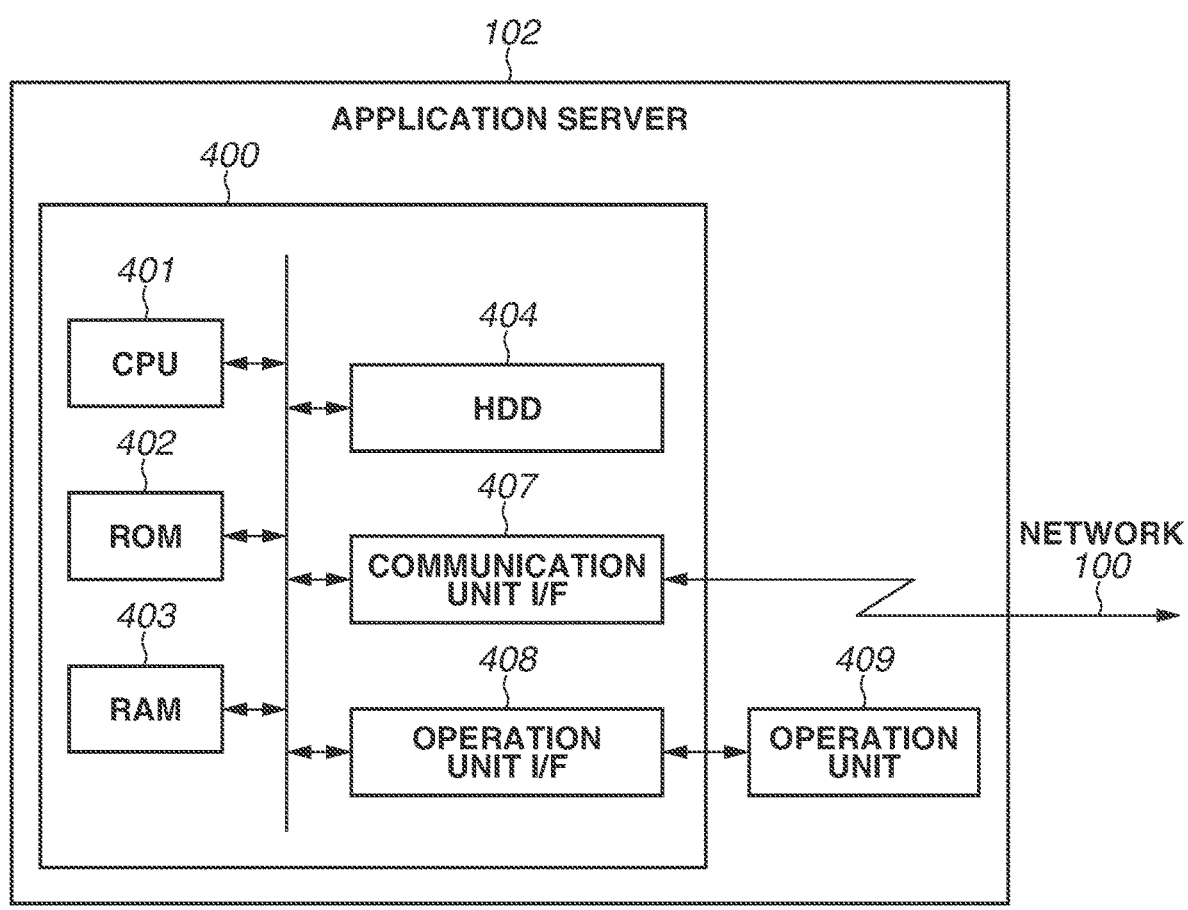
FIG. 4 is a diagram illustrating an example of a hardware configuration of an application server.

FIG. 4 illustrates an example of the hardware configuration of the application server 102. A control unit 400 including a CPU 401 controls the overall operation of the application server 102. The CPU 401 consists of an arithmetic circuit, and reads out a program stored in a ROM 402 or an HDD 404 into a RAM 403, and performs various types of processing. The ROM 402 stores therein, for example, a system program for use in control of the application server 102. The HDD 404 stores, for example, application programs for various types of processing. The HDD 404 is an example of a storage device according to the present embodiment. In another exemplary embodiment, the storage device can be an SSD or the like.

A chat application for providing a chat service and various types of bot applications are installed in the HDD 404, and executed by the CPU 401. The HDD 404 also stores tenant information including, for example, information about an image processing apparatus that the chat application cooperates with. The tenant information can be stored in an external server or the like.

A communication unit I/F 407 is an interface for connecting various apparatuses to the application server 102. The communication unit OF 407 communicates with the image processing apparatus 101 and the like via the network 100 based on control by the CPU 401.

An operation unit I/F 408 is connected to an operation unit 409. The operation unit 409, for example, displays information to the user and receives an input from the user.

The hardware configuration of the user terminal 103 is similar to that of the application server 102. As such, a detailed description of the user terminal's 103 configuration will be omitted herein.

Figure 5:
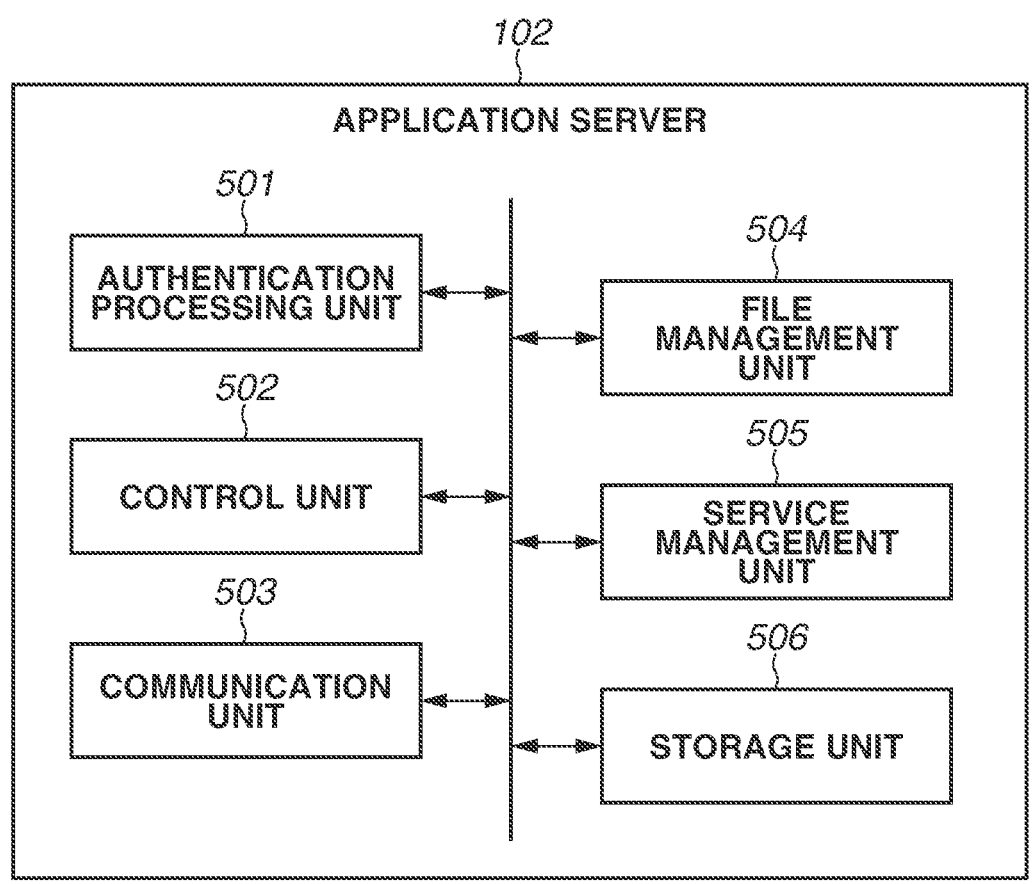
FIG. 5 is a diagram illustrating an example of the software configuration of the application server.

FIG. 5 illustrates an example of the software configuration of the application server 102. More specifically, the example of the software configuration illustrated in FIG. 5 is for processing required to provide a chat service provided by the chat application installed in the application server 102. The CPU 401 executes a control program that enables each of the functional units illustrated in FIG. 5 to be realized.

An authentication processing unit 501 processes a login/logout request directed to the application server 102. In a case where an authentication request for a login is received from the user, the authentication processing unit 501 performs the authentication processing and returns an authentication result.

A communication unit 503 carries out communication such as data transmission/reception with the image processing apparatus 101 and apparatuses in the network 100 via the communication unit I/F 407. In a case where a request is received from the image processing apparatus 101 or the user terminal 103, the communication unit 503 transmits a content of the request to a control unit 502. In a case where a result and data after the control unit 502 processes the request is received, the communication unit 503 transmits a response to the image processing apparatus 101 or the user terminal 103.

The control unit 502 instructs a file management unit 504 to perform processing, such as storing, deleting, moving, or updating image data received from the image processing apparatus 101 based on the content of the request received via the communication unit 503.

The file management unit 504 instructs the storage unit 506 to store the image data or deletes, moves, or updates previously stored image data based on the instruction from the control unit 502. A service management unit 505 manages various types of applications and services, such as the chat application and the bot service, installed in the application server 102.

The storage unit 506 stores specified data into the ROM 402, the RAM 403, or the HDD 404 or reads out stored data therefrom based on an instruction from another functional unit. In the present exemplary embodiment, the storage unit 506 stores image data received via the communication unit 503, the tenant information, and the like.

Figure 17:
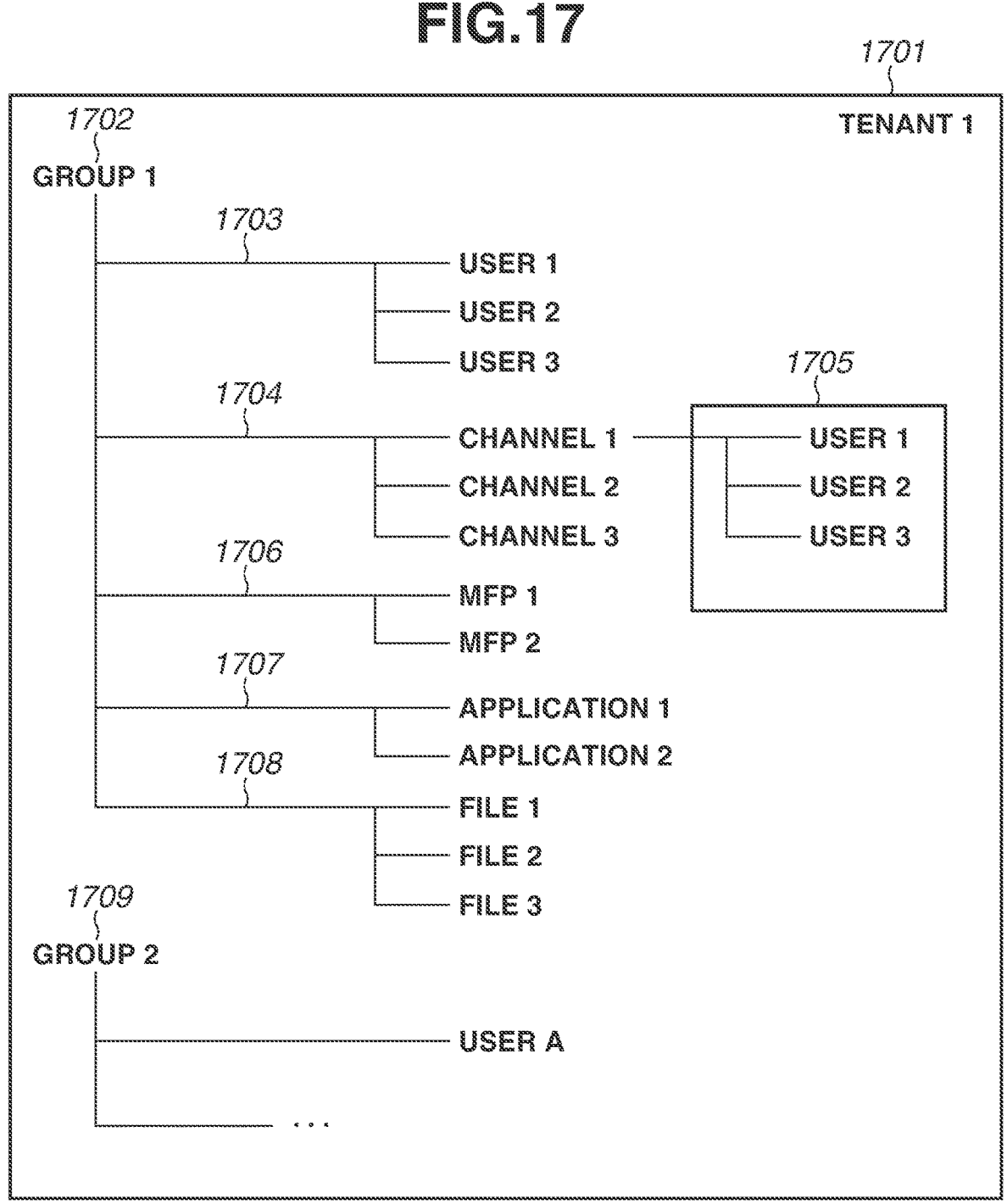
FIG. 17 is a diagram illustrating an example of tenant information stored hard disk drive (HDD) in the application server.

FIG. 17 illustrates an example of tenant information 1701 stored in the HDD 404 in the application server 102. One or more groups are associated with the tenant information 1701, and two groups, a group 1 (1702, herein below may be referred to as group information 1702) and a group 2 (1709, herein below may be referred to as group information 1709), are present in the example illustrated in FIG. 17. Depending on the configuration of the chat application, there can be a case where one piece of group information is contained in one piece of tenant information. In such a case, the tenant information 1701 and the group information are equivalent to each other.

The groups 1 (1702) and 2 (1709) have information forming the respective group, and user information 1703, channel information 1704, printer information 1706, cooperative application information 1707, and a file 1708 are associated with the group 1 (1702).

The user information 1703 is information for identifying each user belonging to the group. The channel information 1704 is information for grouping the user information 1703, and contains a list 1705 in which corresponding pieces of the user information 1703 is grouped channel by channel, in the chat application, a talk room (a chat room) is generated for each channel indicated in the channel information 1704, and the user exchanges message and image data with another user in the talk room.

The printer information 1706 is information for identifying a printer that is the image processing apparatus 101. The printer information 1706 can be an Internet Protocol (IP) address or a Media Access Control (MAC) address of the printer, or can be an identification (ID) usable to uniquely identify the printer. The ID can he an ID issued by the image processing apparatus 101 when the information about the image processing apparatus 101 is registered in the application server 102.

Referring to the printer information 1706 enables an application using the group information 1702 to transmit a command, such as a print command, to a target MFP. While the printer information 1706 is associated with a group in the present exemplary embodiment, the printer information 1706 can be associated with a channel or can be associated with cooperative application information, which will be described below. For example, the tenant information 1701 can be configured such that an MFP 1 is associated with an application 1 and MFPs 1 and 2 are associated with an application 2. The printer information 1706 can be associated with the tenant information 1701. More specifically, in the case of a tenant 1 in FIG. 17, a printer indicated by the printer information 1706 associated in common in the tenant 1 is used.

The cooperative application information 1707 is information for identifying a cooperative application, such as a bot application, associated with the group 1 (1702). The cooperative application indicated by the cooperative application information 1707 is an application installed in the application server 102.

The file 1708 is a file stored in association with the group 1 (1702). For example, the file 1708 is transmitted to the image processing apparatus 101, and the image processing apparatus 101 can print the file 1708. While the file 1708 is associated with the group 1 (1702) in the present exemplary embodiment, in another exemplary embodiment, each file can be associated channel by channel. For example, in a case where a user posts a file to a channel 1, which is a talk room, the posted file is stored in association with the channel 1. The user can, for example, check the stored file in the channel and download the stored file to the user terminal 103.

In a case where a user list is referred to in a chat application corresponding to the tenant information 1701, the application server 102 refers to information stored in the HDD 404. Pieces of information to be referred to include the group information 1702 and the user information 1703, which are provided in the form of a list. The same also applies to the channel information 1704, the printer information 1706, the cooperative application information 1707, and the file 1708.

Figure 6:
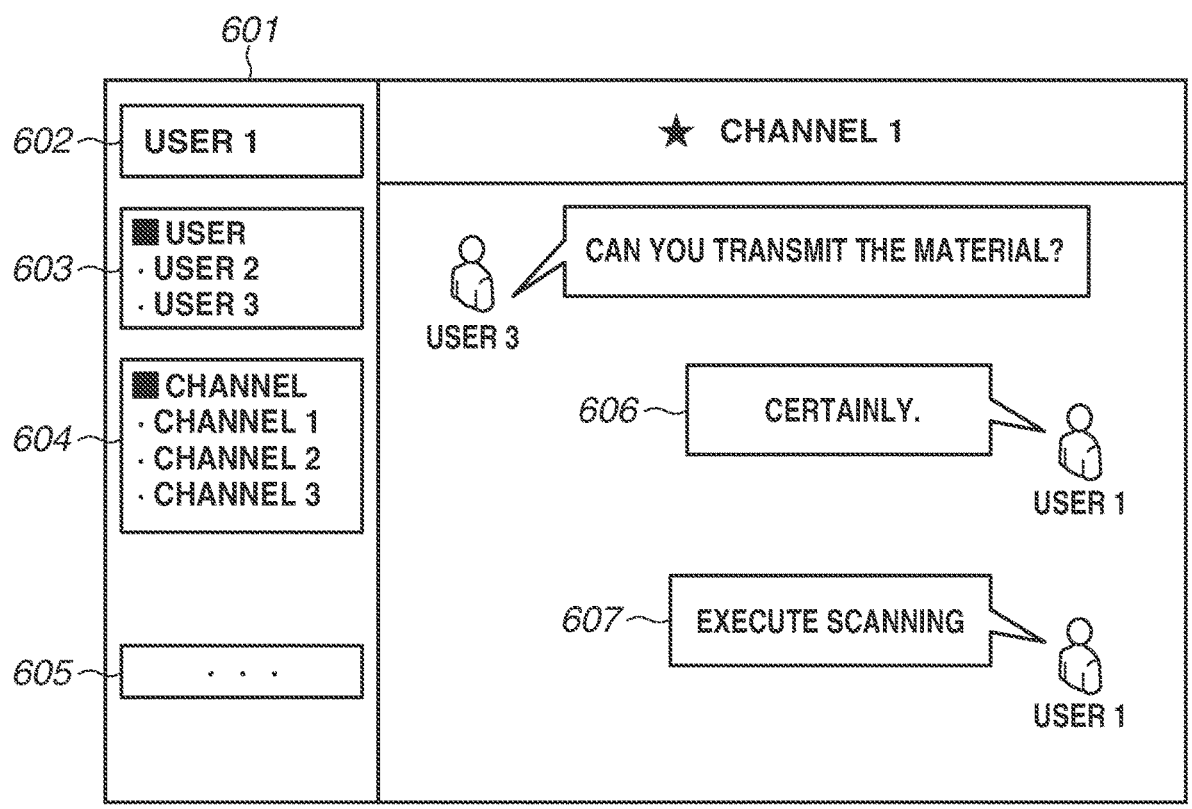
FIG. 6 is a diagram illustrating an example of a screen provided by a chat application installed in the application server.

FIG. 6 illustrates an example of a screen provided by the chat application installed in the application server 102. A chat screen 601 is a screen provided by the chat application. The user terminal 103 connects to the application server 102 and receives various types of information, such as message data, to display the chat screen 601 on a display unit or an operation unit of the user terminal 103. The user can, for example, post a message to and upload a file from the chat service by operating the chat screen 601 via the user terminal 103.

A username 602 indicates user information of the user displaying the chat screen 601. More specifically, the username 602 indicates user information corresponding to a user logged into the chat service via the user terminal 103.

A user list 603 and a channel list 604 display other users' information and channels information, respectively. The channels can be set project by project, topic by topic, or the like, and an access right of members of respective groups can also be set. The present implementation is applicable to the cases of a talk room, a chat room, a workspace, a team, or a group, etc. . . .

The channel 1 is displayed on the chat screen 601 in response to the user selecting the channel 1 from the channel list 604. As illustrated in FIG. 17, a user 1, a user 2, and a user 3 participate in the channel 1. Thus, a message and a file posted in the channel 1 can be viewed and downloaded just by the user 1, the user 2, and the user 3 participating in the channel 1. A user not participating in the channel 1 cannot view and download a message and a file posted to the channel 1.

In a case where the user selects a chat partner from the user list 603, the user can exchange a message with the selected chat partner. In a case where the channel information 1704 is selected, the user can exchange a message with all the members belonging to the selected channel.

A service operation button 605 is a button for various types of service operations, such as a bot service. Selecting the operation button 605 causes a service selection screen (not illustrated) to be displayed. The user can via this screen, for example, install, start up, and search for a service. To start each of the various types of services, the user can issue a start instruction to a service by using the service operation button 605 or a service can be started in synchronization with a start of the chat application. A service can also be started in response to a user's message.

A history of a message received from the chat partner with which the user is currently exchanging a message is displayed on the chat screen 601 of the channel 1. The user 3 is a user belonging to the channel 1, and a message posted by the user 3 is displayed on the chat screen 601. A message 606 is a history of a message transmitted from the user 1. The message may be characters as indicated in the message 606, and, in a case where a file is attached, an icon indicating an extension of the file may also be displayed.

A scanning execution instruction message 607 is a message for instructing a scan bot application to be started and executed. The scan bot application is started in response to a message "execute scanning" serving as a trigger. In the present exemplary embodiment, a document that the user wants to scan is set on the image processing apparatus 101 and the message "execute scanning" triggers the start of the scan bot application. This causes a scan setting screen 1601, which will be described below with reference to FIG. 16A, to be displayed. Settings regarding scanning, such as a reading size and a file format are set via the scan setting screen 1601, and the image processing apparatus 101 is notified of the set contents together with the scanning execution instruction.

An encrypted file can also be specified as the file format on the scan setting screen 1601. The user can input an encryption password on an encryption password setting screen 1605, which will be described below, or the scan bot application can generate a random password and notify the image processing apparatus 101 of the generated password. Encrypting the file to be uploaded in the above-described manner can prevent the file from being viewed by many and unspecified users if the uploaded file is leaked out.

Scan settings to be applied can be determined in advance, and the chat application may start the scan bot application and perform processing as far as the scanning execution instruction, in response to the message "execute scanning".

Figure 7:
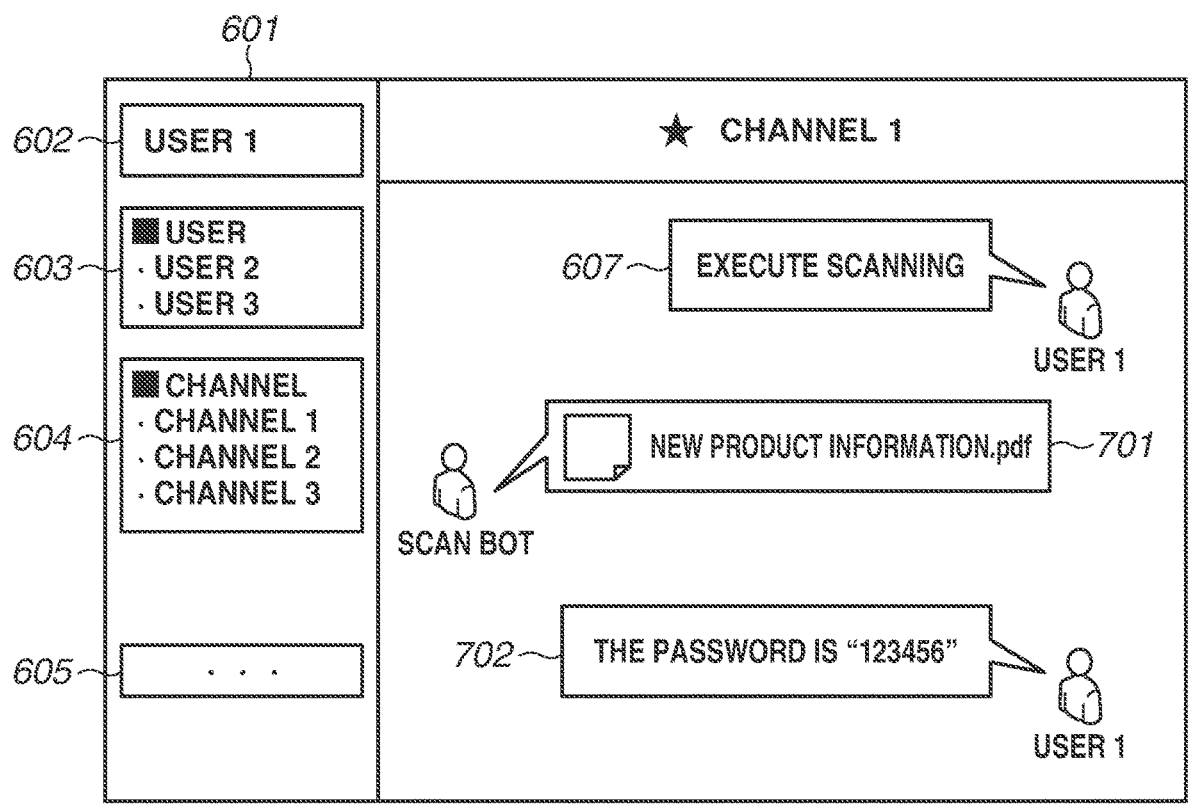
FIG. 7 is a diagram illustrating an example of a screen provided by the chat application installed in the application server.

FIG. 7 illustrates an example of a screen provided by the chat application installed in the application server 102. Detailed descriptions of the reference numbers that are the same as those in FIG. 6 are omitted herein.

In a case where the chat application is instructed to execute scanning with the scanning execution instruction message 607, the scan bot application is started and the scan setting screen 1601 is displayed. In a case where the scan settings are set on the scan setting screen 1601 and an execution instruction is issued, the scan settings and the scanning execution instruction are transmitted from the application server 102 to the image processing apparatus 101. The image processing apparatus 101 is notified, along with the settings and the instruction, of, for example, channel information to be used when data is transmitted from the device and an access token if necessary.

In this process, on the scan setting screen 1601, PDF is specified as scanned data to be generated, encryption setting is enabled, and an encryption password is set. The image processing apparatus 101 generates an encrypted file using the set password and transmits a file of the scanned data to the application server 102 based on the channel information that the image processing apparatus 101 is notified of. The scan bot application uploads the received file of the scanned data to a folder corresponding to the channel 1 and notifies the users with a message 701 indicating that the file is received by providing a link for accessing the uploaded file. In the example illustrated in FIG. 7, an encrypted file named "new product information.pdf" is uploaded. Notifying the users with a link to the file is not seen to be limiting. In another exemplary embodiment, the file can be displayed on the channel.

Since the file named "new product information.pdf" is encrypted with the password set by the user 1, another user who opens the file and checks the content is requested to input the password. When the password set by the user 1 is input, the file can be opened, and if an incorrect password is entered, the file cannot be opened The user 1 notifies the other users participating in the channel 1 of the password set by the user 1 to enable the other users participating in the channel 1 to open the file named "new product information.pdf". In the example illustrated in FIG. 7, the user 1 posts a message 702 including the password set by the user 1. In this process, the user 1 inputs the content of the message 702 and posts the message 702 to the channel 1 via an operation unit of the user terminal 103.

Figure 8:
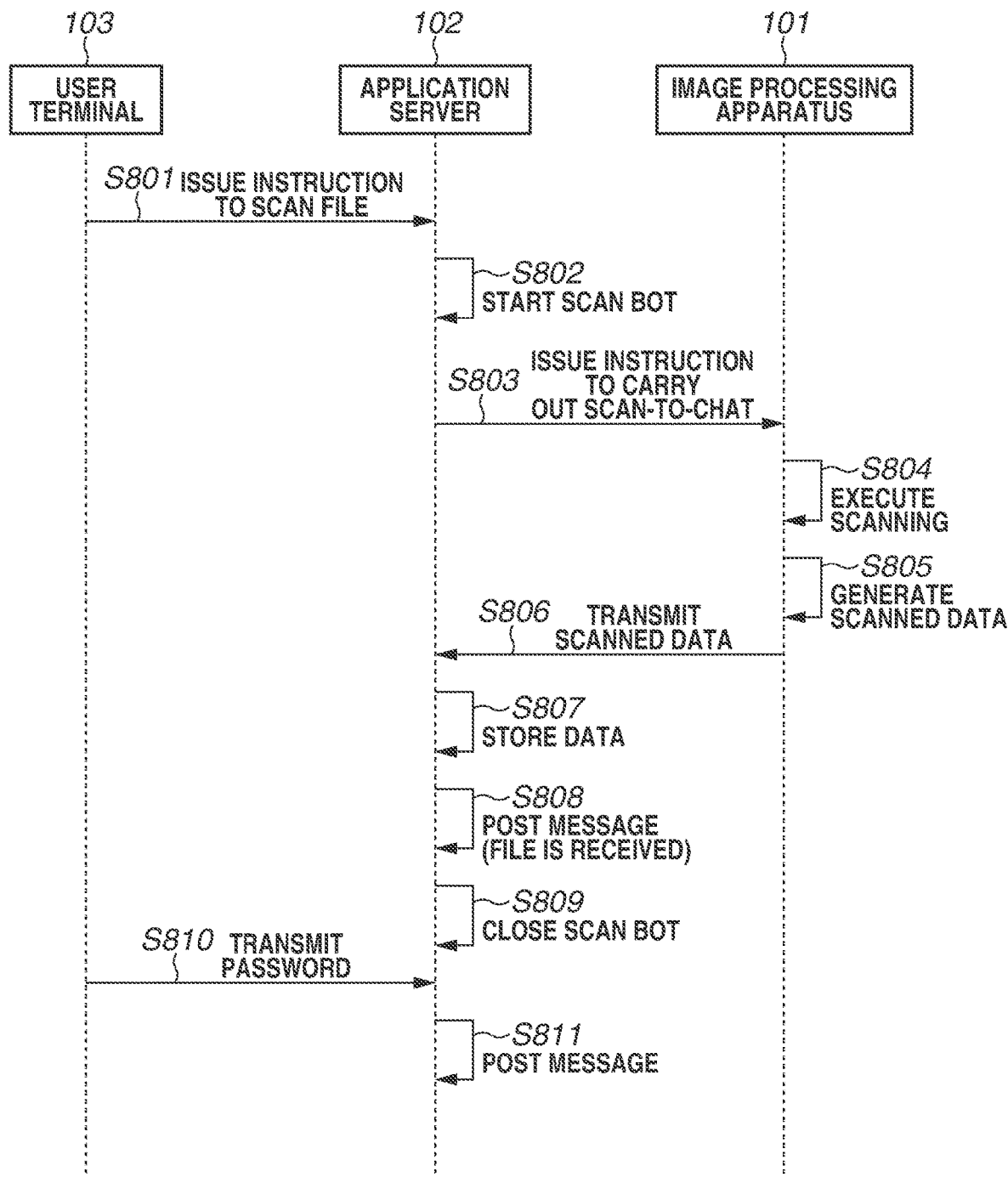
FIG. 8 is a sequence diagram illustrating an example of processing for uploading a file generated by the image processing apparatus to a channel and notifying other users of a file's password.

FIG. 8 is a sequence diagram illustrating an example of processing for uploading the file generated by the image processing apparatus 101 to the channel and notifying other users of the file's password.

The chat screen 601 provided by the chat application is displayed on the operation unit of the user terminal 103. In step S801, in response to the user inputting the scanning execution instruction message 607 via the operation unit and issuing a transmission instruction, the user terminal 103 transmits a message to the application server 102.

In step S802, the chat application in the application server 102 starts the scan bot application. In step S803, the scan bot application displays the scan setting screen 1601, receives the settings from the user, and instructs, along with transmission of various types of setting values (scan settings, an encryption password, and the like) and the channel information, the image processing apparatus 101 to execute scanning and transmit scanned data.

FIGS. 16A to 16C are diagrams illustrating examples of the scan setting screen. As described above, the scan setting screen 1601 is a screen displayed on the chat screen 601 displayed by the user terminal 103 connected to the application server 102. In a second exemplary embodiment, described below, the scan setting screen 1601 is displayed on the operation unit 207 of the image processing apparatus 101.

When the chat application is instructed to execute scanning with the scanning execution instruction message 607, the scan bot application is started and the scan setting screen 1601 is displayed. UIs for inputting the various types of settings related to scanning are displayed on the scan setting screen 1601.

The user 1 selects PDF as the file format on the scan setting screen 1601. For the reading size, the density, and the document orientation, "A4", "standard", and "portrait" are respectively selected. In a case where a file format selection field 1602 is selected, a PDF setting screen 1603 is displayed as illustrated in FIG. 16B. Detailed settings for PDF formatted file, such as whether to enable encryption, whether to enable a device signature, and whether to split pages, can be set on the PDF setting screen 1603. In a case where the encryption is enabled in an encryption setting field 1604, an encryption password setting screen 1605 is displayed as illustrated in FIG. 16C.

The user can, for example, input and set the password using a keyboard displayed on the screen. The scan settings and the encryption password set on the scan setting screen 1601 are stored in the RAM 403 or the HDD 404. The scan settings and the password transmitted in step S803 are the scan settings and the password acquired by reading out the scan settings and the password set by the user and stored in the RAM 402 or the HDD 404.

The encryption password transmitted in step S803 can be the password input by the user on the scan setting screen 1601 or may be an automatically determined password. In the case where the password is automatically determined, the password may be determined by the scan bot application or may be determined by the image processing apparatus 101 that receives the scanning execution instruction.

The image processing apparatus to which the various types of settings, the scanning execution instruction, and the like are transmitted may be specified by the user on the scan setting screen 1601 or may be posted in association with the scan bot application in advance.

In step S804, the image processing apparatus 101 scans the placed document based on the received scan settings and scanning execution instruction. In step S805, the image processing apparatus 101 generates a file corresponding to the document image read by the scanning and generates an encrypted file using the set password. In step S806, the image processing apparatus 101 uploads the generated scanned data to store the data as a file for the channel 1 in the application server 102 that the image processing apparatus 101 is notified of from the scan but application.

In step S807, the application server 102 stores the received data into the folder for the channel 1. In step S808, the scan bot application posts the message 701 indicating the link to the file received from the image, processing apparatus 101 to the channel 1. In other words, the file generated in the image processing apparatus 101 by scanning the image on the document can be shared in the channel 1. In step S809, the scan bot application is automatically closed.

In step S810, after checking the message indicating that the file is received on the chat screen 601, the user 1 transmits the message 702 for sharing the encryption password. In step S811, the application server 102 performs control to display the received message on the chat screen 601.

In the above-described example illustrated in FIGS. 7 and 8, the user who has instructed the chat application to execute scanning on the chat service typically re-inputs the password set by the user to notify the other users participating in the channel. The processing to be discussed below provides an enhancement to the operation of the present embodiment.

Figure 10:
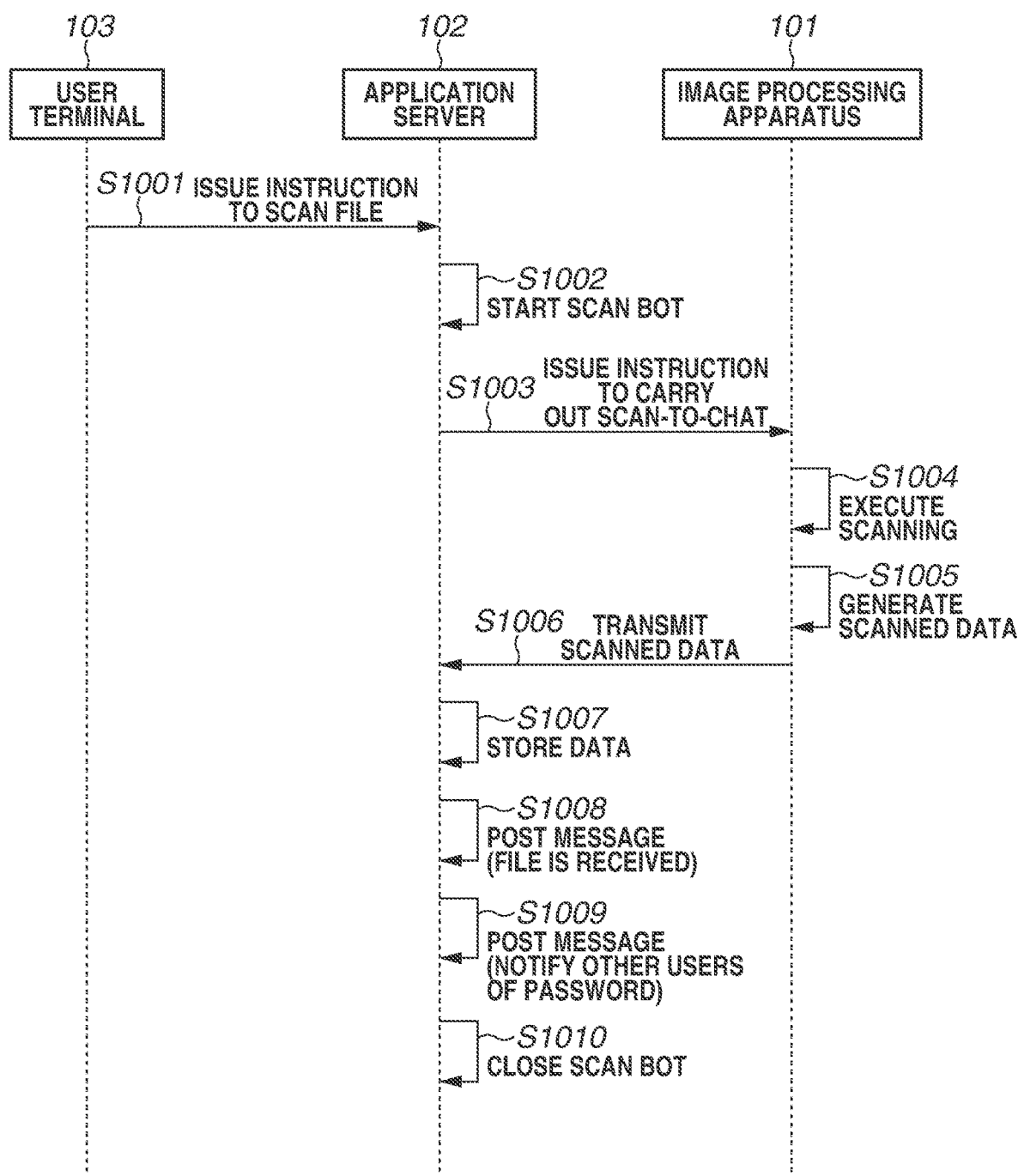
FIG. 10 is a sequence diagram illustrating an example of processing for uploading the file generated by the image processing apparatus to the channel and notifying the other users of the file's password.

FIG. 10 is a sequence diagram illustrating an example of processing for uploading the file generated by the image processing apparatus 101 to the channel and notifying the other users of the file's password.

Figure 9:
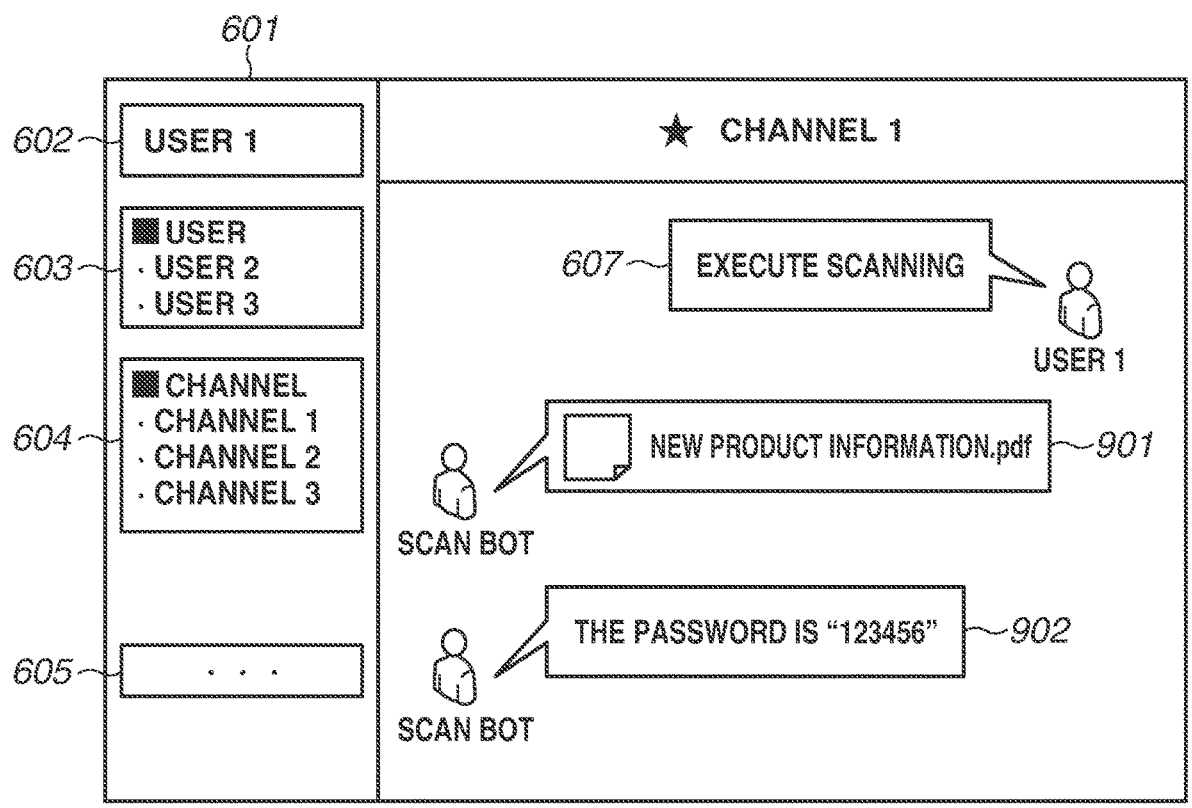
FIG. 9 is a diagram illustrating an example of a screen provided by the chat application installed in the application server.

The processing of steps S1001 to S1008 is similar to steps S801 to S808 described above, and detailed descriptions are omitted herein. In step S1009, the scan bot application notifies the other users of the encryption password set in step S1003 with a message in response to receipt of the file from the image processing apparatus 101 and the link to the file being posted as a message. The chat screen displayed in this process is the chat screen 601 illustrated in FIG. 9. FIG. 9 illustrates an example of the screen provided by the chat application installed in the application server 102.

The scan bot application uploads the file named "new product information.PDF" and posts the link to the file as a message 901 based on the scanning execution instruction issued by the user 1.

The scan bot application then posts the password set on the scan setting screen 1601 with a message 902.

Turning back to FIG. 10, in step S1010, the scan bot application ends its operation.

Figure 11:
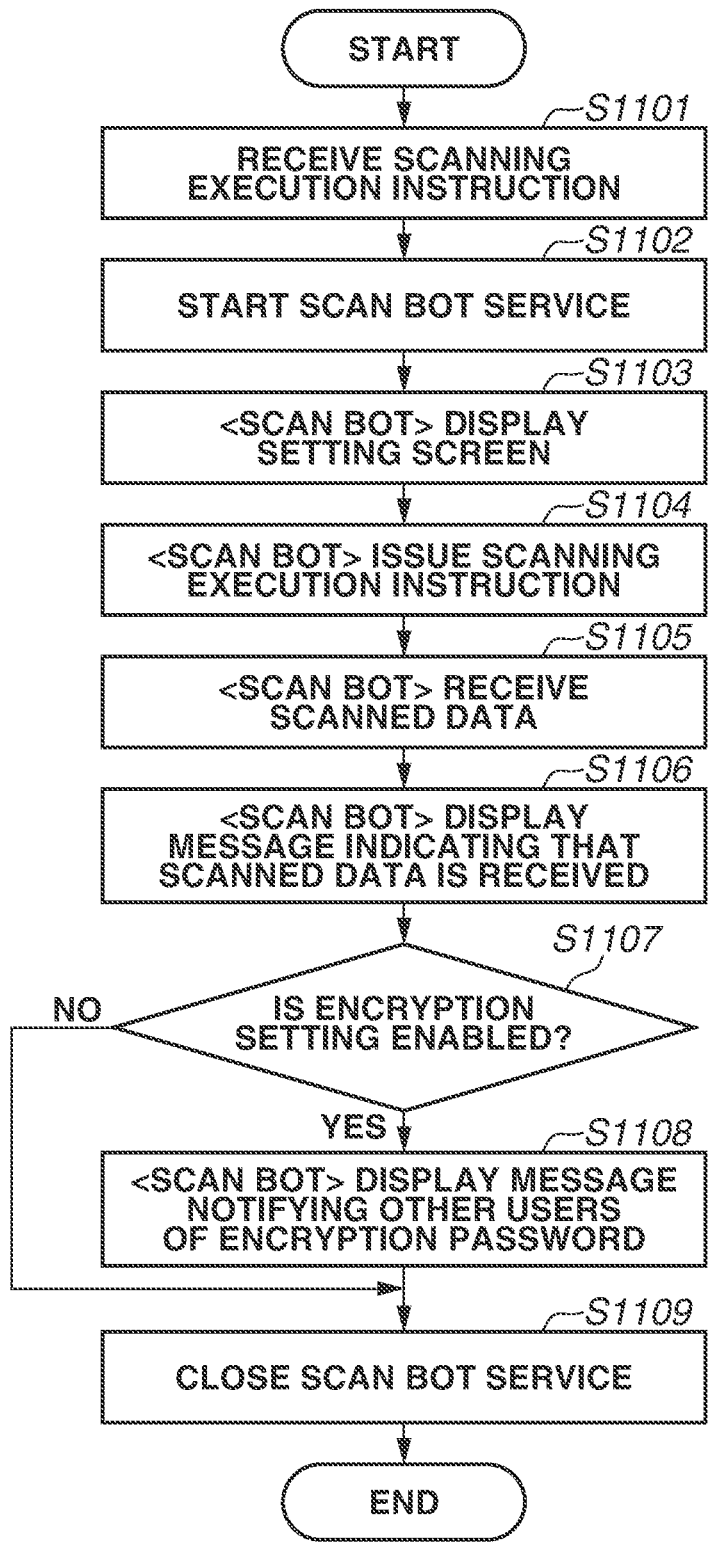
FIG. 11 is a flowchart illustrating an example of the processing for uploading the file generated by the image processing apparatus to the channel and notifying the other users of the file's password.

FIG. 11 is a flowchart illustrating an example of the processing for uploading the file generated by the image processing apparatus to the channel and notifying the other users of the file's password. The flowchart is a processing procedure focusing on the processing performed by the application server 102 in the sequence illustrated in FIG. 10.

In step S1101, the CPU 401 receives the message "execute scanning" from the user terminal 103 via the chat application.

In step S1102, the CPU 401 starts the scan bot application. In step S1103, the CPU 401 executes the scan bot application to display the scan setting screen 1601 on the chat screen 601, and receives the scan settings and the setting of the encryption password. Then, when the user selects an OK button on the scan setting screen 1601, the processing proceeds to step S1104.

The user's selection of the OK button serves as an instruction to execute scanning as well as an instruction to transmit a generated file. The selection of the OK button can be the instruction to execute scanning, and the transmission instruction can be issued in response to a selection of another button on the user terminal 103 or the image processing apparatus 101.

In step S1104, the CPU 401 executes the scan bot application to transmit the scanning execution instruction together with the setting values and the channel information to the image processing apparatus 101 via the communication unit I/F 407.

In step S1105, the CPU 401 receives the file from the image processing apparatus 101 via the communication unit I/F 407.

In step S1106, the CPU 401 executes the scan bot application, and performs control to post and display the message, which notifies the other users that the file is received, including the link to the file on the chat screen 601.

In step S1107, the CPU 401 executes the scan hot application to determine whether the encryption setting has been enabled on the PDF setting screen 1603, which will be described below. When the encryption setting is enabled (YES in step S1107), flow proceeds to step S1108, where the CPU 401 controls the scan bot application to post and display the set encryption password as the message. The channel to which the encryption password is posted is the same channel as the channel to which the message including the link to the file is posted. The processing then proceeds to step S1109.

When the encryption setting is disabled (NO in step S1107), flow proceeds to step S1109. In step S1109, the application server 102 closes the scan hot application.

The above-described processing enables users to save time and work when the image data with the password and the password are shared in the talk room provided via a chat screen.

The above-described processing also enables the password to be shared without a user's additional transmission operation for the password after sharing the file when the user shares the encrypted scanned data via the chat application.

According to the present exemplary embodiment, the password can be easily shared even when the password is not set by the user. A user that can access the talk room can easily decrypt the file.

A second exemplary embodiment will now be described. Only those differences the present embodiment provides from the first exemplary embodiment will he described below. The present exemplary embodiment will be described with respect to a configuration where the scanning execution is initiated by the image processing apparatus 101.

Figure 12:
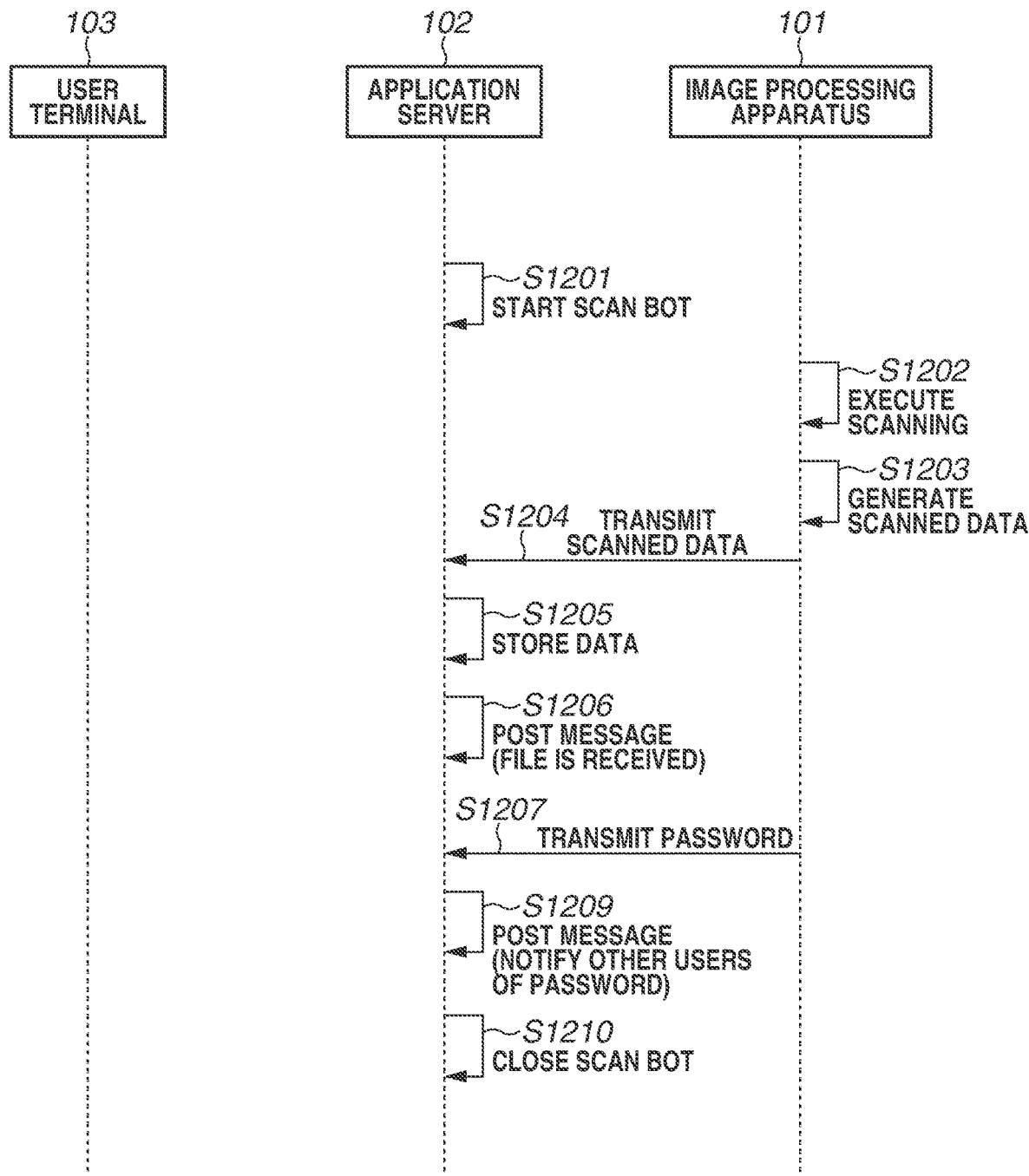
FIG. 12 is a sequence diagram illustrating an example of processing for uploading the file generated by the image processing apparatus to the channel and notifying the other users of the file's password.

FIG. 12 is a sequence diagram illustrating an example of processing for uploading the file generated by the image processing apparatus 101 to the channel and notifying the other users of the file's password. In the present exemplary embodiment, the scanning execution instruction is not issued with the scanning execution instruction message 607 illustrated in the example of the chat screen 601 in FIG. 7.

In step S1201, the application server 102 starts the scan bot application in advance. The user sets the document on the image processing apparatus 101, selects a transmission destination channel, a talk room in which the file is shared, from a selection screen (not illustrated), performs the scan settings and the setting of the encryption password, and then carries out a scan-to-chat operation. The scan settings in the present process can be set via a similar screen to the scan setting screen 1601 displayed on the chat application or via a different screen. In step S1202, the image processing apparatus 101 executes scanning in response to an input of the execution instruction via the operation unit 207 of the image processing apparatus 101. Then, in step S1203, the image processing apparatus 101 generates the encrypted scanned data using the set password.

In step S1204, the image processing apparatus 101 transmits the scanned data to a storage for the channel that is the transmission destination in the application server 102. The processing in step S1204 can be performed in response to an instruction different from the execution instruction received in step S1202 via the operation unit 207 or can be performed based on the same instruction.

In step S1205, the scan bot application stores the data received in step S1204. In step S1206, the scan bot application displays the message 701 indicating that the file is received on the chat screen 601 of the channel. Next, in step S1207, the image processing apparatus 101 notifies the scan bot application of the password with which the scanned data is encrypted. In step S1209, the scan bot application notifies the other users of the received encryption password with a message. In step S1210, the scan but application is automatically closed.

The above-described processing of the present embodiment provides for the scan bot application to start in advance. Receipt of the file from the image processing apparatus 101 can trigger the start of the scan bot application.

The above-described processing enables, when the encrypted file using scan-to-chat is posted from the image processing apparatus 101, the password to be shared without a user's additional transmission operation for the password on the chat application after the user carries out a scan-to-chat operation.

A third exemplary embodiment will now be described. Only those differences the present embodiment provides from the first and second exemplary embodiments will be described below. In the present exemplary embodiment, the password is individually transmitted to a user trying to open the transmitted scanned data, instead of being transmitted to the channel to which the scanned data is transmitted.

Figure 13A:
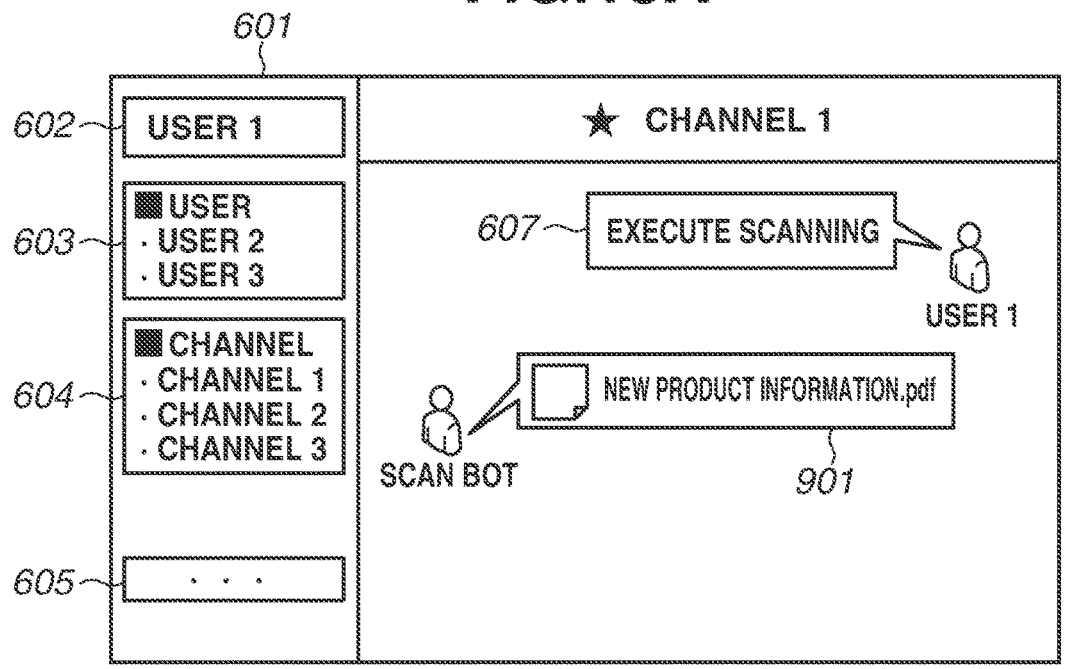
FIGS. 13A to 13C are diagrams each illustrating an example of a screen provided by the chat application installed in the application server.
Figure 13B:
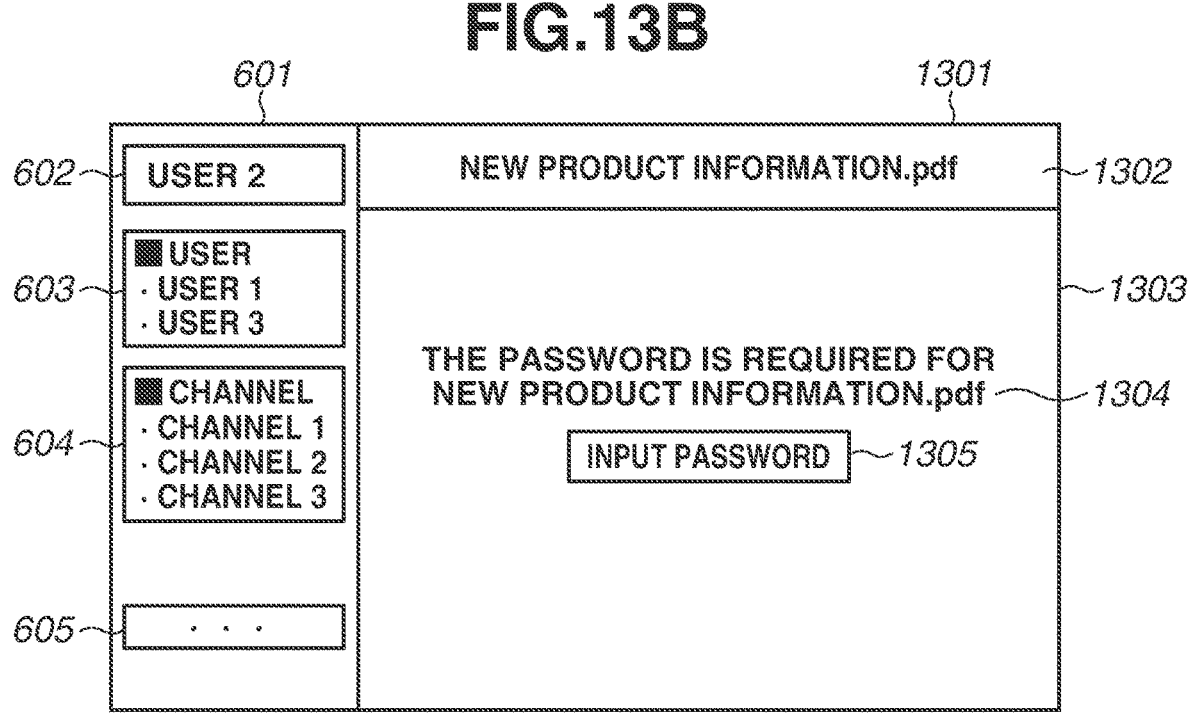
Figure 13C:
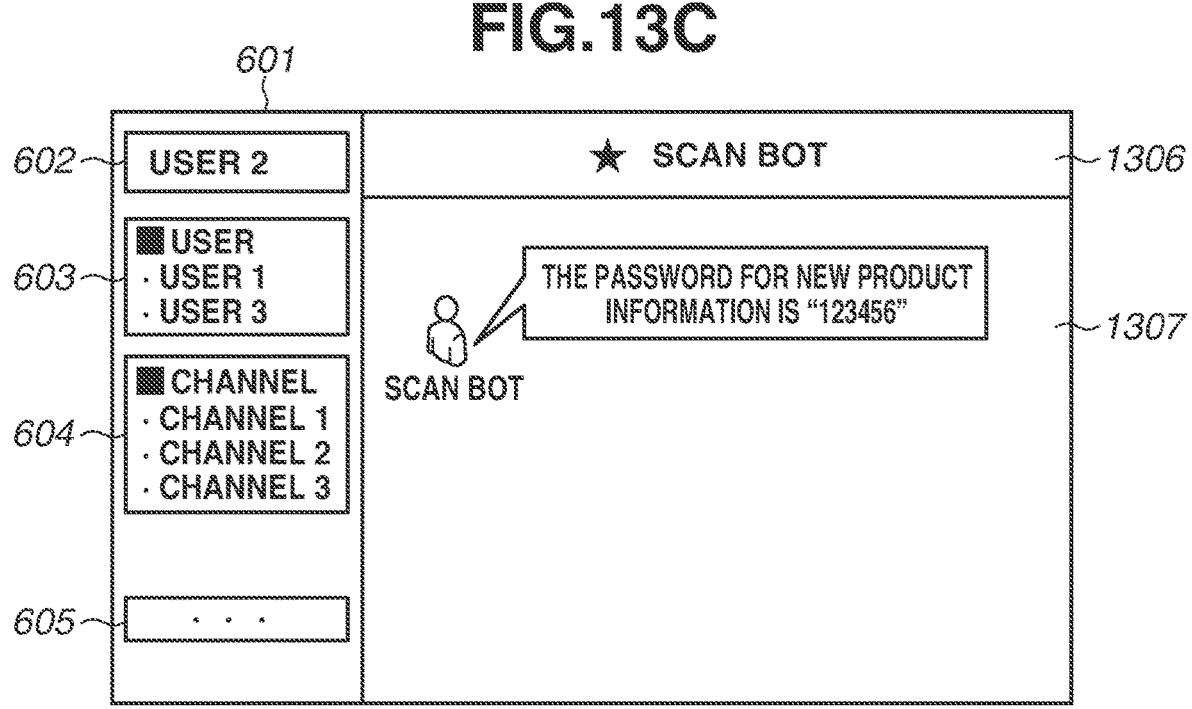

FIGS. 13A to 13C each illustrate an example of a screen provided by the chat application installed in the application server 102.

In FIG. 13A, similar to the first exemplary embodiment, the image processing apparatus 101 is instructed to execute scanning based on the scanning execution instruction message 607. The other users are notified that the file is received from the image processing apparatus 101 with the message 901.

FIG. 13B is an example of a screen when the user 2 accesses the uploaded file in response to the message 901. In response to the user 2 selecting a file icon in the message 901, a password input screen 1301 is displayed. The name of the file that the user 2 refers to is displayed in a filename display field 1302. If the file is not encrypted, the content of the file is displayed in a file display region 1303. If the file is encrypted, a message 1304 prompting the user 2 to input a password and a password input button 1305 are displayed. The user 2 selects the password input button 1305 and inputs the password.

FIG. 13C is an example of a message screen between the user 2 and the scan bot application. The example indicates a one-on-one dialog chat screen between the user and the scan bot application. The name of the scan bot, which is a dialog partner, is displayed in a dialog partner name 1306.

In response to detecting a transition of the user 2 to a screen for viewing the file of the scanned data transmitted to the channel 1, the scan hot application transmits a password notification message 1307 to the user 2 instead of transmitting the password notification message 1307 to the channel 1.

Examples of settings for the time of the transition to a file viewing screen (not illustrated) for the encrypted file include notifying the user of the password, not notifying the user of the password, and notifying a user other than a guest user of the password, which can be selected on a separate setting screen.

Figure 14:
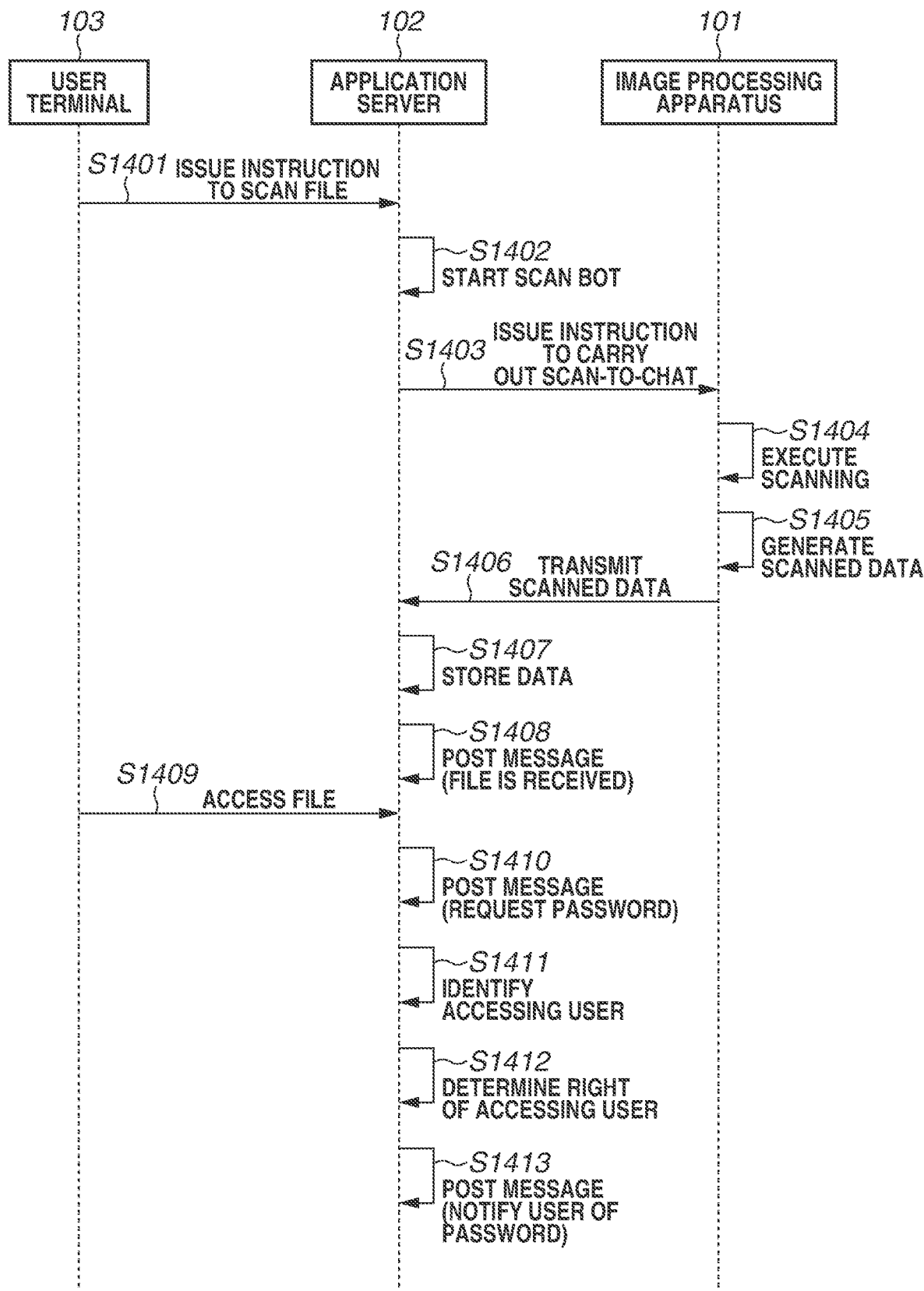
FIG. 14 is a sequence diagram illustrating an example of processing for uploading the file generated by the image processing apparatus to the channel and notifying another user of the file's password.

FIG. 14 is a sequence diagram illustrating an example of processing for uploading the file generated by the image processing apparatus 101 to the channel and notifying the other user of the file's password.

The processing of steps S1401 to S1408 are similar to that of steps S801 to S808, and detailed descriptions are omitted herein. In step S1408, the message 901 indicating that the scanned data is received is displayed. In step S1409, the user 2 selects the message 901. In response to the selection, in step S1410, the screen transitions to the password input screen 1301 and the password input button 1305 is displayed. In step S1411, the scan hot application detects the file access, and identifies the accessing user. After identifying access by the user 2, in step S1412, the scan bot application determines the right of the user 2 whether a password notification setting is applied. In a case where the scan bot application determines that the user 2 is to be notified of the password, in step S1413, the scan bot application transmits the password notification message 1307 notifying the user 2 of the password.

FIG. 15 is a flowchart illustrating an example of the processing for uploading the file generated by the image processing apparatus 101 to the channel and notifying the other user of the file's password. More specifically, the flowchart illustrates a processing procedure performed by the application server 102 in the sequence illustrated in FIG. 14.

The processing of steps S1501 to S1506 are similar to steps S1101 to S1106, and detailed description are omitted herein. In step S1507, in response to the user 2 selecting the message 901 indicating receipt of the scanned data, which is posted by the scan bot application, (YES in step S1507), the screen transitions to the file viewing screen, and flow proceeds to step S1508. In a case where the selected file is a file for which the encryption setting is disabled (NO in step S1508), the processing proceeds to step S1514. In step S1514, the file is displayed on the file viewing screen. Then, in step S1513, the scan bot application is closed. In a case where the encryption setting is enabled for the selected file (YES in step S1508), the processing proceeds to step S1509. In step S1509, the scan bot application identifies that the user accessing the file is the user 2. In step S1510, the scan bot application determines whether the setting regarding the password notification is applied. In a case where the setting is applied (YES in step S1510), the processing proceeds to step S1511. In step S1511, the scan bot application determines whether the user 2 is the notification target. In a case where the user 2 is the notification target (YES in step S1511), the processing proceeds to step S1512. In step S1512, the scan bot application transmits the password notification message 1307 to the user 2. Then, in step S1513, the application server 102 closes the scan bot application. In a case where the setting regarding the password notification is not applied (NO in step S1510), the flow proceeds to step S1512. In a case where the setting regarding the password notification is applied (YES in step S1510) and the user 2 is not the notification target (NO in step S1511), flow proceeds to step S1513. The scan bot application can be closed based on an instruction from the user or the elapse of a predetermined time without being closed automatically.

According to the present exemplary embodiment, a password can be easily shared only with users having an appropriate right without a user's additional transmission operation for the password after sharing a file when the user shares the encrypted scanned data on a channel in which many and unspecified users participate.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-110059, filed Jul. 1, 2021, which is hereby incorporated by reference herein in its entirety.

What is claimed is:

1. A system comprising:
an image processing apparatus; and
an information processing apparatus configured to provide a chat service,
wherein the image processing apparatus includes:
a reading unit figured to read an image on a document,
a memory, and
a processor that executes a program stored in the memory to:
receive a password from a user,
generate an encrypted file including image data based on the read image using the received password, and
transmit the encrypted file and the received password to the information processing apparatus without further receiving a password from the user,
wherein the information processing apparatus comprises:
a memory; and
a processor, wherein the processor executes a program stored in the memory to cause the information processing apparatus to:
receive, from the image processing apparatus, the encrypted file and the received password,
execute processing for posting the received encrypted file to a channel specified by the user and corresponding to the chat service, and
execute processing for posting the received password to the channel.

2. The system according to claim 1, wherein the image processing apparatus further comprises an operation unit via which the password is provided to the image processing apparatus.

3. The system according to claim 1, wherein the password is received in a case where the information processing apparatus receives the password from an external apparatus and the image processing apparatus receives the password from the information processing apparatus.

4. The system according to claim 1, wherein the file is encrypted such that the file is decrypted using the received password.

5. The system according to claim 1, wherein the encrypted file and received password are transmitted based on an execution instruction.

6. The system according to claim 5, wherein the execution instruction is received from an external apparatus in communication with the information processing apparatus and causes the image processing apparatus to read the image on the document and transmit the generated file.

7. The system according to claim 5, wherein the execution instruction is an execution instruction input via an operation unit of the image processing apparatus and causes the image processing apparatus to read the image on the document and transmit the generated file.

8. The system according to claim 1, wherein the processing for posting the received password to the channel is executed after the processing for posting the received encrypted file to the channel specified by the user is executed.

9. The system according to claim 8, wherein the processing for posting the received password to the channel is executed in response to receipt of an instruction from the user after the processing for posting the received encrypted file to the channel specified by the user is executed.

10. An image processing apparatus that communicates with an information processing apparatus configured to provide a chat service, the image processing apparatus comprising:
a reading unit configured to read an image on a document;
a memory; and
a processor that executes a program stored in the memory to:
receive a password from a user;
generate an encrypted file including image data based on the read image using the received password; and
transmit, without further receiving a password from the user, the encrypted file and the received password to the information processing apparatus such that the encrypted file and the received password are posted to a channel of the chat service.

11. The image processing apparatus according to claim 10, wherein the password is provided to the image processing apparatus via an operation unit of the image processing apparatus.

12. The image processing apparatus according to claim 10, wherein the password is received in a case where the information processing apparatus receives the password from an external apparatus and the image processing apparatus receives the password from the information processing apparatus.

13. The image processing apparatus according to claim 10, wherein the file is encrypted such that the file is decrypted using the received password.

14. The image processing apparatus according to claim 10, wherein the encrypted file and received password are transmitted based on an execution instruction.

15. The image processing apparatus according to claim 14, wherein the execution instruction is received from an external apparatus in communication with the information processing apparatus and causes the image processing apparatus to read the image on the document and transmit the generated file.

16. The image processing apparatus according to claim 14, wherein the execution instruction is an execution instruction input via an operation unit of the image processing apparatus and causes the image processing apparatus to read the image on the document and transmit the generated file.

17. A method for controlling an image processing apparatus that communicates with an information processing apparatus configured to provide a chat service, the method comprising:
reading an image on a document;
receiving a password from a user;
generating an encrypted file including image data based on the read image using the received password; and
transmitting, without further receiving a password from the user, the encrypted file and the received password to the information processing apparatus such that the encrypted file and the received password are posted to a channel of the chat service.

* * * * *